(12) United States Patent
Welchko et al.

(10) Patent No.: US 8,278,933 B2
(45) Date of Patent: Oct. 2, 2012

(54) METHOD AND SYSTEM FOR MONITORING POWER ELECTRONICS CONTROLLERS IN AUTOMOTIVE ELECTRICAL SYSTEMS

(75) Inventors: Brian A. Welchko, Torrance, CA (US); Silva Hiti, Redondo Beach, CA (US); Abbas Raftari, West Bloomfield, MI (US); Jeong J. Park, Ann Arbor, MI (US); Hanne Buur, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 499 days.

(21) Appl. No.: 12/565,982

(22) Filed: Sep. 24, 2009

(65) Prior Publication Data

US 2011/0068727 A1    Mar. 24, 2011

(51) Int. Cl.
*G01R 31/00* (2006.01)
(52) U.S. Cl. .......................................... 324/503
(58) Field of Classification Search .................. None
See application file for complete search history.

(56) References Cited

FOREIGN PATENT DOCUMENTS

| JP | 2007249612 A | * | 9/2007 |
| JP | 2008211908 A | * | 9/2008 |

* cited by examiner

*Primary Examiner* — Paresh Patel
(74) *Attorney, Agent, or Firm* — Ingrassia Fisher & Lorenz, P.C.

(57) ABSTRACT

Methods and systems are provided for monitoring an automotive electrical system including an inverter having at least one switch. First and second voltage commands corresponding to respective first and second components of a commanded voltage vector on a synchronous frame of reference coordinate system are received. A plurality of duty cycles for operating the at least one switch are calculated based on the first and second voltage commands. First and second actual voltages are calculated based on the plurality of duty cycles. The first and second actual voltages correspond to respective first and second components of an actual voltage vector on the synchronous frame of reference coordinate system. An indication of a fault is generated based on the difference between the first components of the commanded voltage vector and the actual voltage vector and the difference between the second components of the commanded voltage vector and the actual voltage vector.

20 Claims, 4 Drawing Sheets

METHOD AND SYSTEM FOR MONITORING POWER ELECTRONICS CONTROLLERS IN AUTOMOTIVE ELECTRICAL SYSTEMS

TECHNICAL FIELD

The present invention generally relates to automotive electrical systems, and more particularly relates to a method and system for monitoring power electronics control systems in automotive electrical systems.

BACKGROUND OF THE INVENTION

In recent years, advances in technology, as well as ever-evolving tastes in style, have led to substantial changes in the design of automobiles. One of the changes involves the complexity of the electrical and drive systems within automobiles, particularly alternative fuel vehicles, such as hybrid, battery electric, and fuel cell vehicles. Such alternative fuel vehicles typically use one or more electric motors, perhaps in combination with another actuator, to drive the wheels.

Such vehicles often use two separate voltage sources, such as a battery and a fuel cell, to power the electric motors that drive the wheels. Power electronics, such as direct current-to-direct current (DC/DC) converters, are typically used to manage and transfer the DC power from one of the voltage sources and convert to more or less voltage. Also, due to the fact that alternative propulsion automobiles typically include direct current (DC) power supplies, direct current-to-alternating current (DC/AC) inverters (or power inverters) are also provided to invert the DC power to alternating current (AC) power, which is generally required by the motors.

The power electronics units typically perform their respective function, at least in part, using one or more power switches or transistors, which are controlled by the vehicles control system. To insure the operating integrity of the electric drive system, a multi-layer monitoring system may be used to ensure that the output of the electric drive (torque, speed, etc.) is as requested, or possibly in the case of a fault situation, as delivered.

A commonly employed first layer monitoring system performs diagnostics on all sensor inputs. Such low level diagnostics may include checking whether a sensor is able to communicate or checking to see if a sensor reading is within its expected or allowable operating range. Such sensors (e.g., physical or virtual software replacements) may include current sensors, voltage sensors, position sensors, temperature sensors, and the like.

Often, a second layer monitors the control system to ensure that it is producing the intended outputs, such as the power switch duty cycles generated by the Pulse Width Modulation (PWM) system. A conventional method for checking the duty cycles is to essentially perform an entire redundant calculation. However, such a calculation demands considerable processing power and memory.

Accordingly, it is desirable to provide a method and system for performing second layer monitoring of the duty cycles used to control power electronics in automotive electrical systems. Furthermore, other desirable features and characteristics of the present invention will become apparent from the subsequent description taken in conjunction with the accompanying drawings and the foregoing technical field and background.

SUMMARY OF THE INVENTION

A method for monitoring an automotive electrical system including an inverter having at least one switch is provided. First and second voltage commands corresponding to respective first and second components of a commanded current vector on a synchronous frame of reference coordinate system are received. A plurality of duty cycles for operating the at least one switch are calculated based on the first and second voltage commands. First and second actual voltages are calculated based on the plurality of duty cycles. The first and second actual voltages correspond to respective first and second components of an actual voltage vector on the synchronous frame of reference coordinate system. An indication of a fault is generated based on the difference between the first component of the commanded voltage vector and the first component of the actual voltage vector and the difference between the second component of the commanded voltage vector and the second component of the actual voltage vector.

A method for monitoring an automotive electrical drive system including an inverter having at least one switch is provided. First and second voltage commands are received. The first and second voltage commands corresponding to respective d- and q-components of a commanded current vector on a d-q coordinate system. A plurality of duty cycles for operating the at least one switch are calculated based on the first and second voltage commands. First and second actual voltages are calculated based on the plurality of duty cycles. The first and second actual voltages correspond to respective d- and q-components of an actual voltage vector on the d-q coordinate system. An indication of a fault is generated based on the difference between the d-component of the commanded voltage vector and the d-component of the actual voltage vector and the difference between the q-component of the commanded voltage vector and the q-component of the actual voltage vector.

An automotive electrical system is provided. The automotive electrical system includes an electric motor, an inverter coupled to the electric motor, the inverter comprising at least one switch, a Pulse Width Modulation (PWM) modulator coupled to the inverter, and a processing system in operable communication with the electric motor, the inverter, and the PWM modulator. The processing system is configured to receive first and second voltage commands corresponding to respective first and second components of a commanded voltage vector on a synchronous frame of reference coordinate system, calculate a plurality of duty cycles for operating the at least one switch based on the first and second voltage commands, calculate first and second actual voltages based on the plurality of duty cycles, the first and second actual voltages corresponding to respective first and second components of an actual voltage vector on the synchronous frame of reference coordinate system, and generate an indication of a fault based on the difference between the first component of the commanded voltage vector and the first component of the actual voltage vector and the difference between the second component of the commanded voltage vector and the second component of the actual voltage vector.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-5 are merely illustrative and may not be drawn to scale.

FIG. 1 to FIG. 5 illustrate a method and/or system for monitoring an automotive electrical system. The electrical system includes a power electronics unit (e.g., a direct current-to-alternating current (DC/AC) inverter or a direct current-to-direct current (DC/DC) converter) with one or more power switches or transistors. First and second voltage commands corresponding to respective first and second components of a commanded voltage vector on a synchronous frame of reference coordinate system are received. A plurality of duty cycles for operating the at least one switch are calculated based on the first and second voltage commands. First and second actual voltages are calculated based on the plurality of duty cycles. The first and second actual voltages correspond to respective first and second components of an actual voltage vector on the synchronous frame of reference coordinate system. An indication of a fault is generated based on the difference between the first component of the commanded voltage vector and the first component of the actual voltage vector and the difference between the second component of the commanded voltage vector and the second component of the actual voltage vector.

Figure 1:
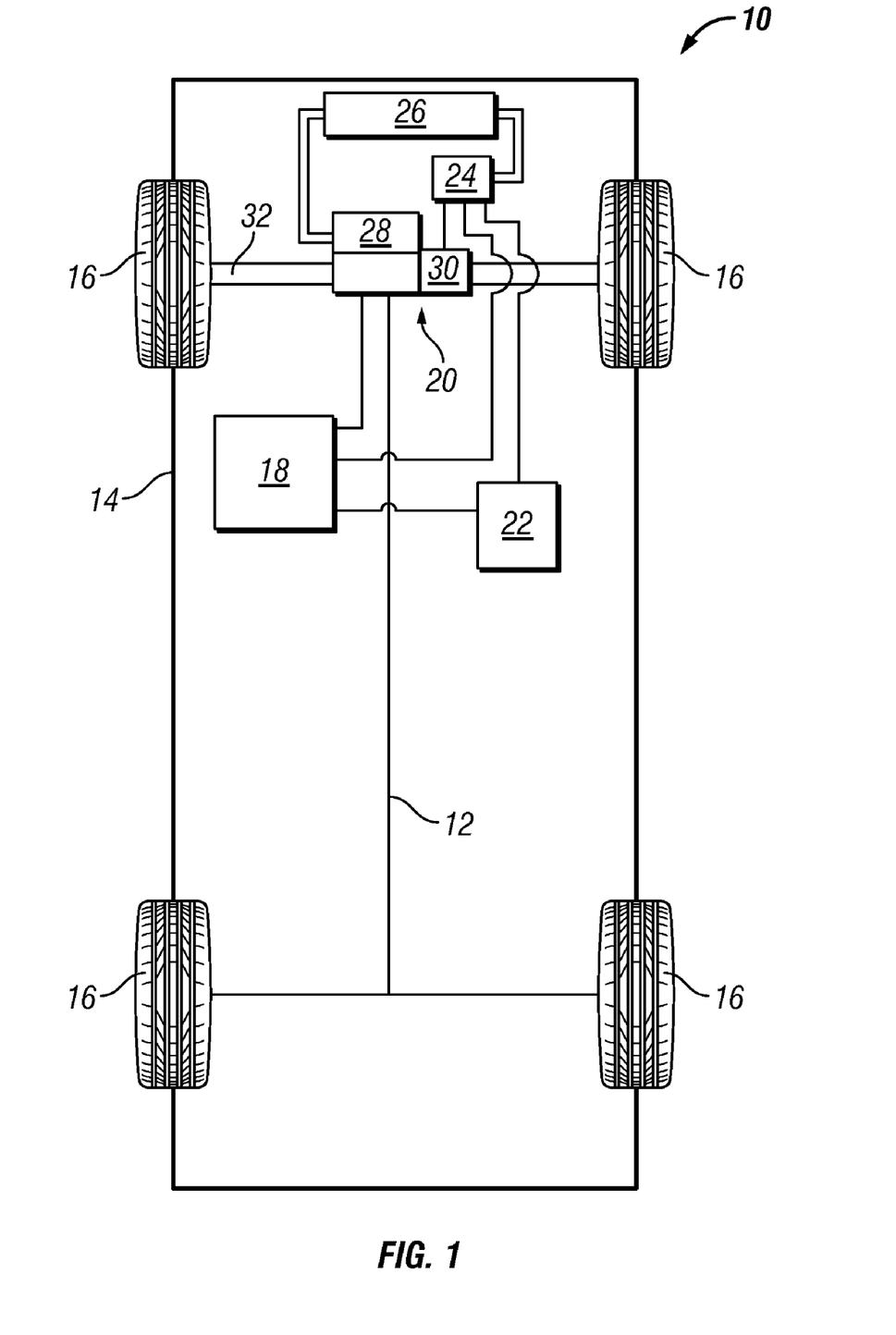
FIG. 1 is a schematic view of an exemplary automobile according to one embodiment of the present invention.

FIG. 1 illustrates a vehicle (or "automobile") 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 1, the automobile 10 is an HEV, and further includes an actuator assembly 20, a battery (or a DC power supply) 22, a power converter assembly (e.g., an inverter or inverter assembly) 24, and a radiator 26. The actuator assembly 20 includes a combustion engine 28 and an electric motor/generator (or motor) 30.

Still referring to FIG. 1, the combustion engine 28 and/or the electric motor 30 are integrated such that one or both are mechanically coupled to at least some of the wheels 16 through one or more drive shafts 32. In one embodiment, the automobile 10 is a "series HEV," in which the combustion engine 28 is not directly coupled to the transmission, but coupled to a generator (not shown), which is used to power the electric motor 30. In another embodiment, the automobile 10 is a "parallel HEV," in which the combustion engine 28 is directly coupled to the transmission by, for example, having the rotor of the electric motor 30 rotationally coupled to the drive shaft of the combustion engine 28.

The radiator 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the combustion engine 28 and the inverter 24.

Referring again to FIG. 1, in the depicted embodiment, the inverter 24 receives and shares coolant with the electric motor 30. However, other embodiments may use separate coolants for the inverter 24 and the electric motor 30. The radiator 26 may be similarly connected to the inverter 24 and/or the electric motor 30.

The electronic control system 18 is in operable communication with the actuator assembly 20, the high voltage battery 22, and the inverter 24. Although not shown in detail, the electronic control system 18 includes various sensors and automotive control modules, or electronic control units (ECUs), such as an inverter control module, a motor controller, and a vehicle controller, and at least one processor and/or a memory which includes instructions stored thereon (or in another computer-readable medium) for carrying out the processes and methods as described below.

Figure 2:
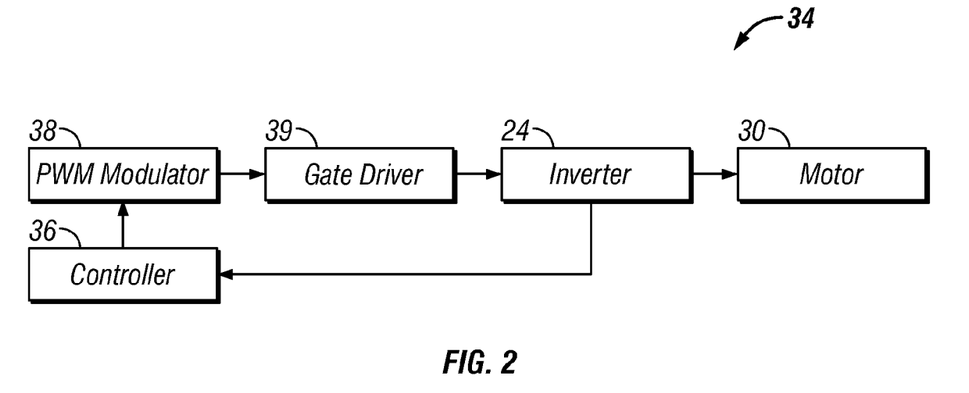
FIG. 2 is a block diagram of a voltage source inverter system within the automobile of FIG. 1.

Referring to FIG. 2, an inverter control system (or electric drive system) 34, in accordance with an exemplary embodiment of the present invention, is shown. The voltage source inverter system 34 includes a controller 36 in operable communication with a Pulse Width Modulation (PWM) modulator 38 (or a pulse width modulator) and the inverter 24 (at an output thereof). The PWM modulator 38 is coupled to a gate driver 39, which in turn has an input coupled to an input of the inverter 24. The inverter 24 has a second output coupled to the electric motor 30. The controller 36 and the PWM modulator 38 may be integral with the electronic control system 18 shown in FIG. 1.

Figure 3:
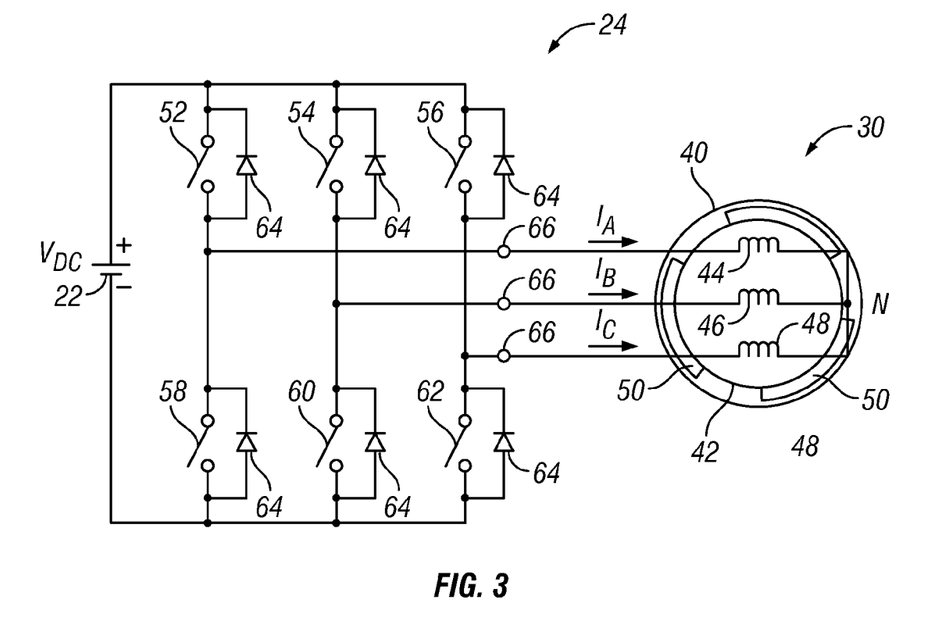
FIG. 3 is a schematic view of a voltage source, an inverter, and an electric motor within the automobile of FIG. 1.

FIG. 3 schematically illustrates the battery 22, the inverter 24 (or power converter), and the electric motor 30 of FIGS. 1 and 2 in greater detail. The inverter 24 includes a three-phase circuit coupled to the electric motor 30. More specifically, the inverter 24 includes a switch network having a first input coupled to the battery 22 (i.e., a voltage source (VDC)) and an output coupled to the electric motor 30. Although a single voltage source is shown, a distributed DC link with two series sources may be used.

As will be appreciated by one skilled in the art, the electric motor 30, in one embodiment, includes a stator assembly 40 (including conductive coils or windings) and a rotor assembly 42 (including a ferromagnetic core and/or magnets), as well as a transmission and a cooling fluid (not shown). The stator assembly 40 includes a plurality (e.g., three) conductive coils or windings 44, 46, and 48, each of which is associated with one of three phases of the electric motor 30, as is commonly understood. The rotor assembly 42 includes a plurality of magnets 50 and is rotatably coupled to the stator assembly 40, as is commonly understood. The magnets 50 may include multiple electromagnetic poles (e.g., sixteen poles), as is commonly understood. It should be understood that the description provided above is intended as example of one type of electric motor that may be used. One skilled in the art will appreciate that the techniques described below may be applied to any type of electric motor.

The switch network comprises three pairs (a, b, and c) of series switches with antiparallel diodes (i.e., antiparallel to each switch) corresponding to each of the phases of the electric motor 30. Each of the pairs of series switches comprises a first switch, or transistor, (i.e., a "high" switch) 52, 54, and 56 having a first terminal coupled to a positive electrode of the voltage source or battery 22 and a second switch (i.e., a "low" switch) 58, 60, and 62 having a second terminal coupled to a negative electrode of the voltage source or battery 22 and a first terminal coupled to a second terminal of the respective first switch 52, 54, and 56.

As is commonly understood, each of the switches 52-62 may be in the form of individual semiconductor devices such as insulated gate bipolar transistors (IGBTs) within integrated circuits formed on semiconductor (e.g. silicon) substrates (e.g., die). As shown, a diode 64 is connected in an antiparallel configuration (i.e., "flyback" or "freewheeling" diodes) to each of the switches 52-62. As such, each of the switches 52-62 and the respective diode 64 may be understood to form a switch-diode pair or set, six of which are included in the embodiment shown.

Still referring to FIG. 3, the inverter 24 and/or the electric motor 30 includes a plurality of current sensors 66, each of which is configured to detect the flow of current through a respective one of the windings 44, 46, and 48 of the electric motor 30 (and/or through the respective switches 52-62 or diodes 64).

During normal operation (i.e., driving), referring to FIG. 1, the automobile 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30. As will be appreciated by one skilled in the art, the conversion of DC power to AC power is substantially performed by operating (i.e., repeatedly switching) the transistors within the inverter 24 at a "switching frequency," such as, for example, 12 kilohertz (kHz).

Referring to FIG. 2, generally, the controller 36 produces a Pulse Width Modulation (PWM) signal for controlling the switching action of the inverter 24. The inverter 24 then converts the PWM signal to a modulated voltage waveform for operating the electric motor 30. The inverter system 34 of FIG. 2 consists of multiple operations during normal, or forward, operation including, but not limited to, receiving a torque command, converting the torque command to current commands based on present speed and available voltage, and performing regulation on such current commands. The output of the current regulator (not shown) is the output voltage needed to produce the requested currents. The PWM modulator 38 and the gate driver 39 generate the necessary gate pulses (or duty cycles) which are sent to the inverter 24 to control the electric motor 30 to the desired speed and/or torque. Additional considerations may be employed by the forward control path such as system temperatures, limitations, and additional communications or feedbacks to the overall system control in terms of operating status and availability.

Figure 4:
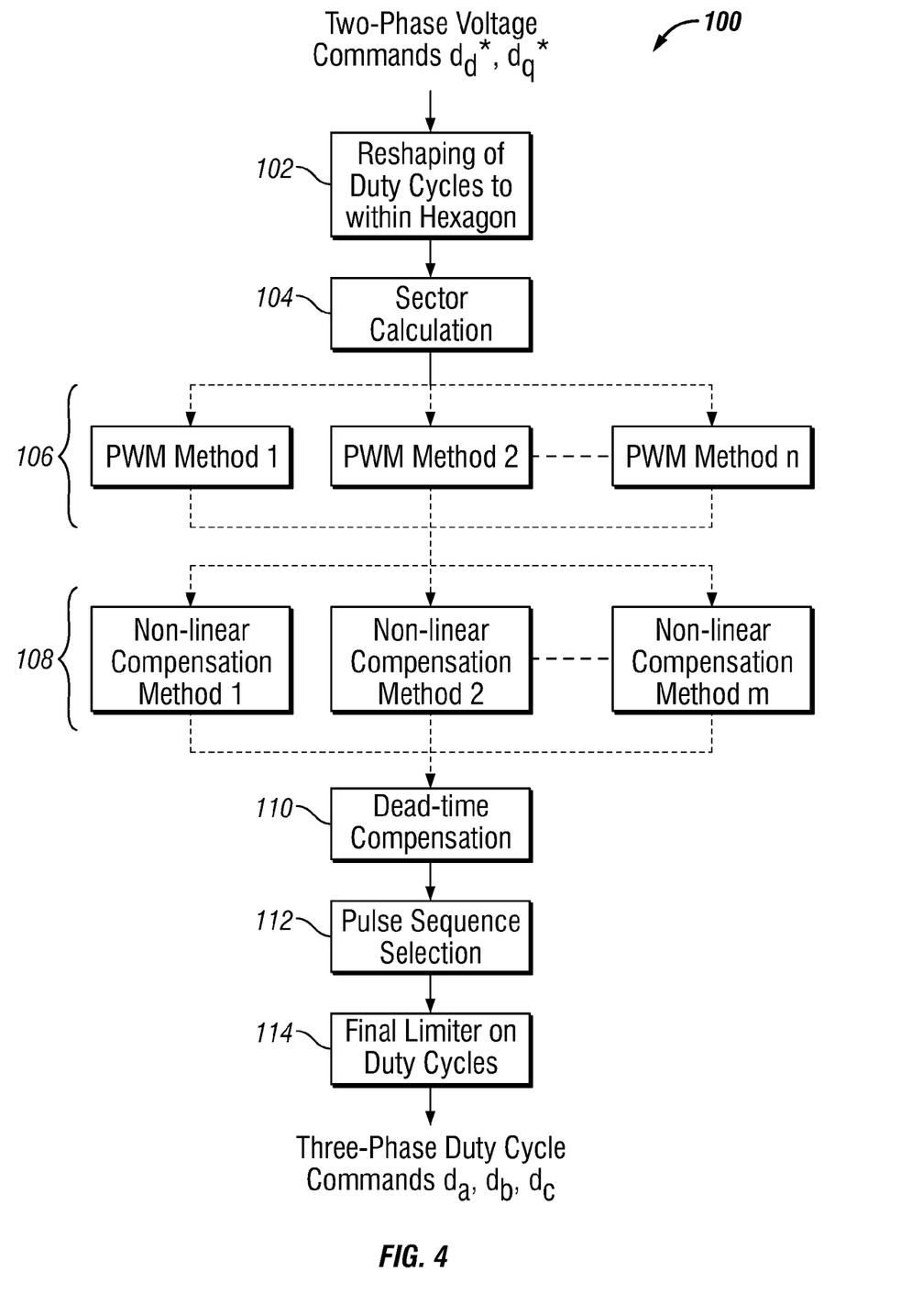
FIG. 4 is a flow chart of an example of a method for calculating duty cycles for control the inverter of FIG. 3.

FIG. 4 illustrates an example of a PWM method (and/or system) 100 for generating duty cycles, which may be implemented by the system 34 shown in FIG. 2. As shown, the method 100 may employ multiple PWM control algorithms which are selected based on, for example, the optimization of losses (low or high), control harmonics, control audible properties, control distortion, or control sampling properties.

As shown, the PWM method 100 begins by receiving voltage commands in the d-q synchronous reference frame as $d_d^*$ and $d_q^*$. For purposes of illustration, the voltage commands are in the form of duty cycles as opposed to actual voltages. As is commonly understood, the difference between voltages and duty cycles may simply be a matter of where the DC link voltage is accounted for (i.e., duty cycles may be considered to be normalized voltage commands). It should be understood that the voltage commands have been limited by the current regulation module to be achievable (i.e. within the unit circle corresponding to six-step operation overlaid on the PWM voltage space hexagon, as commonly understood). At step 102, the voltage commands are reshaped if the system is operating in the overmodulation region, as is commonly understood in the art. If the system is not in overmodulation, the voltage commands are unchanged. At step 104, the operating sector (e.g., I-VI) is determined based on the synchronous frame commands and the present or commanded angular position of the rotor 42 (FIG. 3). At step 106, a PWM algorithm is selected and utilized. Multiple PWM algorithms are often available to the PWM system, and the algorithm which is chosen is typically based upon some secondary criteria. For example, a discontinuous PWM (DPWM) method may be chosen to minimize losses or a continuous PWM (CPWM) method may be chosen to minimize harmonic distortion. Further, there are often multiple choices within the DPWM or CPWM sub-categories.

Once the selected PWM method calculations are performed, the PWM method 100 may select a non-linear compensation method at step 108. The non-linear compensation method chosen may be based upon the selected PWM method in consideration of any existing hardware limitations which would cause the delivered output voltage of the inverter 24 to deviate from the commanded output voltage. At step 110, dead-time compensation methods may be performed to account for the inherent inverter dead-time, as is commonly understood. At step, 112, the PWM method 100 may choose among multiple pulse sequences, such as Center Active Vector, Center Null Vector, or Positive or Negative Logic, as will be appreciated by one skilled in the art. Finally, at step 114, the PWM method may employ limiting functions to ensure that the duty cycles being transferred to the inverter 24 are achievable and delivers the duty cycle commands (da, db, dc) to the respective phase legs of the inverter 24.

Ideally, a second layer of monitoring processes all inputs and perform all calculations independently, utilizing separate memory and data storage areas. Then, the two calculations would be compared, and if identical, the calculations may be considered to be correct, or secure. However, such a procedure essentially doubles the computing power and memory required, which may not always be feasible. As a result, the second layer may be run at a slower rate than the normal forward control path. Employing a multi-rate strategy is particularly effective when the subsystem being monitored is executed very quickly when compared to the physical characteristics of the system. For example, executing the PWM function every 50-100 microseconds (μS) when the torque response of the motor is on the order of 20-50 milliseconds (mS) allows for failure detection prior to a significant system output (e.g., torque) change. As such, in order to perform a secondary monitor on the PWM system, creating a duplicate path, even at a slower rate involves coordinating a large amount of data and calculations as indicated in FIG. 4.

According to one aspect of the present invention, a simplified calculation strategy which still allows a determination of a secured calculation based on the inputs and outputs of the PWM system is provided.

Figure 5:
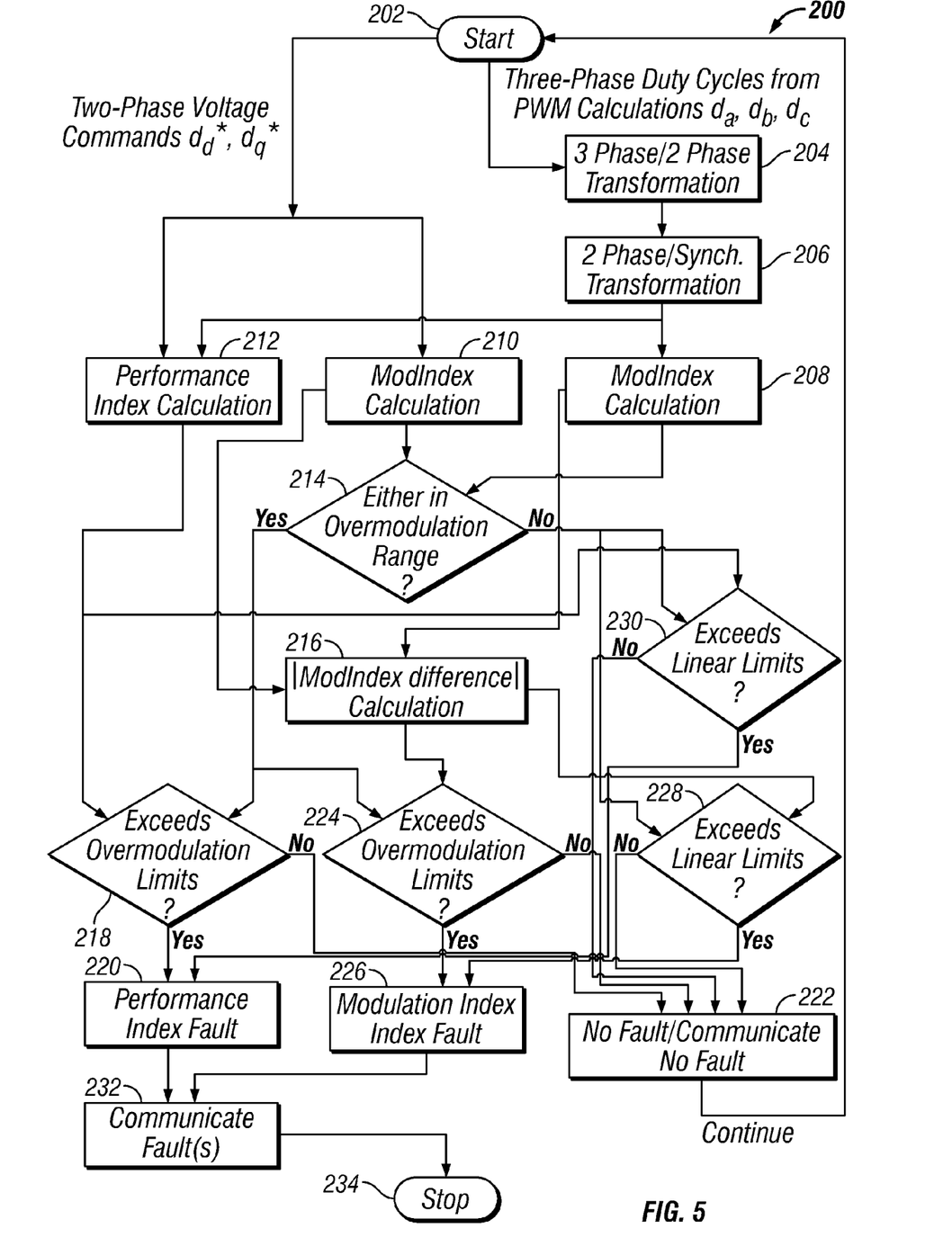
FIG. 5 is a flow chart of a method for monitoring the calculation of the duty cycles according to one embodiment of the present invention.

FIG. 5 illustrates a method (or system) 200 for second layer monitoring of the PWM performance in accordance with one embodiment of the present invention. The method 200 begins at step 202 by sampling all of the inputs from the primary calculation path for use in the monitor. The details needed to ensure that all of the inputs correspond to the same time frame are not covered here, but it is required and assumed that all such inputs are associated with the same time step and/or the appropriate part of the time step (e.g., beginning, end, etc.).

At step 204, the three phase duty cycles ($d_a$, $d_b$, $d_c$) are converted to two phase quantities ($d_\alpha$, and $d_\beta$). The conversions occur as $$\begin{bmatrix} d_a \\ d_b \end{bmatrix} = k \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} d_a \\ d_b \\ d_c \end{bmatrix} \quad (1)$$

The scaling factor k in Equation 1 is a constant which is dependent upon the convention of the two-phase transformation used. For example, the transformation may be power invariant, amplitude invariant, or employ some other normalization quantity. The stationary two-frame duty cycles from the PWM system is then converted to synchronous frame quantities ($d_d$ and $d_q$), or actual voltages, at step 206 as $$\begin{bmatrix} d_d \\ d_q \end{bmatrix} = \begin{bmatrix} \sin q & \cos q \\ \cos q & -\sin q \end{bmatrix} \begin{bmatrix} d_a \\ d_b \end{bmatrix} \quad (2)$$

where θ is the phase angle of the commanded voltages. The modulation index of the PWM system is calculated at step 208 as $$M_i = \sqrt{d_d^2 + d_q^2} \quad (3)$$

The modulation index of the voltage commands ($d_d^*$ and $d_q^*$) is calculated at step 210 as $$M_i^* = \sqrt{d_d^{*2} + d_q^{*2}} \quad (4)$$

A performance index (PerfIndex) is calculated at step 212 as $$\text{PerfIndex} = \sqrt{(d_d^* - d_d)^2 + (d_q^* - d_q)^2} \quad (5)$$

As will be appreciated by one skilled in the art, the voltage commands ($d_d^*$ and $d_q^*$) and the actual voltages ($d_d$ and $d_q$) may correspond to d- and q-components of respective voltage vectors (commanded and actual) on a synchronous frame of reference (d-q) coordinate system. Therefore, the calculation performed in Equation 5 may correspond to determining a "distance," or "difference" between the commanded and actual voltage vectors (i.e., the square root of the summed differences between the d-axis components and the q-axis components is equal to the difference between the two vectors).

In alternative embodiments, the square of the modulation index for both (3) and (4) and/or the square of (5) may be calculated and subsequently used for the process of the secondary PWM monitor. At step 214, the process determines if either $M_i$ or $M_i^*$ are larger than a predetermined threshold indicated that the PWM system may be considered to be operating in the overmodulation region. At step 216, the system calculates the absolute value of the difference in the modulation indexes as $$M_i \text{Diff} = |M_i - M_i^*| \quad (6)$$

If the process determined that the system is operating in the overmodulation region at step 214, the process continues to step 218 where the performance index is compared to a predetermined threshold (PerfIndexThreshOvermod). If the threshold is exceeded, the process continues to step 220 where a performance index fault has been determined to be active. If not exceeded, a fault state is not detected and the process continues to step 222. If the system is operating in overmodulation in step 214, the modulation index difference is compared to a predetermined threshold (ModIndexThreshOvermod) at step 224. If the threshold is exceeded, the process continues to step 226 where a modulation index fault is active. If not exceeded, a fault state is not active and the process continues to step 222.

If the process determines that the system is not in overmodulation at step 214, the modulation index difference and performance index are compared to respective predetermined thresholds (ModIndexThreshNormal and PerfIndexThreshNormal) at steps 228 and 230. If either exceeds the respective threshold, the process proceeds to note that the respective fault is active at steps 220 and/or 226. If the thresholds are not exceeded the process continues to step 222. If a fault is determined to be active at 220 and/or 226, the process continues to step 232 where the fault is communicated to a supervisory system controller. In one embodiment, the system proceeds to step 234 and stops the control system.

Other embodiments allow for the supervisory system controller to provide additional instructions to the secondary monitor, for example, to continue its monitoring function while the supervisory system controller services the fault detected by the secondary PWM monitor. If a fault was not detected as indicated by step 222, the process continues its monitoring function by returning to step 202.

One advantage is that a simplified method (and/or system) for performing second layer monitoring of the PWM system is provided. As a result, the processing power and memory required to perform the monitoring is reduced, which may reduce manufacturing costs and/or allow resources to be used for other purposes.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for monitoring an automotive electrical system comprising an inverter having at least one switch, the method comprising:
   receiving first and second voltage commands corresponding to respective first and second components of a commanded voltage vector on a synchronous frame of reference coordinate system;
   calculating a plurality of duty cycles for operating the at least one switch based on the first and second voltage commands;
   calculating first and second actual voltages based on the plurality of duty cycles, the first and second actual voltages corresponding to respective first and second components of an actual voltage vector on the synchronous frame of reference coordinate system; and
   generating an indication of a fault based on the difference between the first component of the commanded voltage vector and the first component of the actual voltage vector and the difference between the second component of the commanded voltage vector and the second component of the actual voltage vector.

2. The method of claim 1, wherein the generating of the indication of the fault is further based on the square of the difference of the first components and the square of the difference of the second components.

3. The method of claim 2, wherein the generating of the indication of the fault is further based on the sum of the square of the difference of the first components and the square of the difference of the second components.

4. The method of claim 3, wherein the generating of the indication of the fault is further based on the square root of the sum of the square of the difference of the first components and the square of the difference of the second components.

5. The method of claim 4, wherein the generating of the indication of the fault further comprises calculating a modulation index of the command voltage vector and a modulation index of the actual voltage vector.

6. The method of claim 5, wherein the generating of the indication of the fault is further based on an absolute value of a difference between the modulation index of the command voltage vector and a modulation index of the actual voltage vector.

7. The method of claim 1, wherein the synchronous frame of reference coordinate system is a d-q coordinate system, the first components of the commanded voltage vector and the actual voltage vector are d-components, and the second components of the commanded voltage vector and the actual voltage vector are q-components.

8. The method of claim 7, wherein the generating of the indication of the fault is further based on a performance index equal to $\sqrt{(d_d^*-d_d)^2+(d_q^*-d_q)^2}$, where $d_d^*$ is the d-component of the commanded voltage vector, $d_q^*$ is the q-component of the commanded voltage vector, $d_d$ is the d-component of the actual voltage vector, and $d_q$ is the q-component of the actual voltage vector.

9. The method of claim 8, wherein the generating of the indication of the fault is further based on a commanded modulation index equal to $\sqrt{d_d^{*2}+d_q^{*2}}$, an actual modulation index equal to $\sqrt{d_d^2+d_q^2}$, and an absolute value of a difference between the commanded modulation index and the actual modulation index.

10. The method of claim 9, further comprising determining if at least one of the commanded modulation index and the actual modulation is above a modulation index threshold.

11. The method of claim 9, wherein the generating of the indication of the fault further comprises:
   comparing the performance index to a first threshold if at least one of the commanded modulation index and the actual modulation index is above the modulation index threshold; and
   comparing the performance index to a second threshold if the commanded modulation index and the actual modulation index are below the modulation index threshold.

12. A method for monitoring an automotive electrical drive system comprising an inverter having at least one switch, the method comprising:
   receiving first and second voltage commands, the first and second voltage commands corresponding to respective d- and q-components of a commanded voltage vector on a d-q coordinate system;
   calculating a plurality of duty cycles for operating the at least one switch based on the first and second voltage commands;
   calculating first and second actual voltages based on the plurality of duty cycles, the first and second actual voltages corresponding to respective d- and q-components of an actual voltage vector on the d-q coordinate system; and
   generating an indication of a fault based on the difference between the d-component of the commanded voltage vector and the d-component of the actual voltage vector and the difference between the q-component of the commanded voltage vector and the q-component of the actual voltage vector.

13. The method of claim 12, wherein the generating of the indication of the fault is further based on a performance index equal to $\sqrt{(d_d^*-d_d)^2+(d_q^*-d_q)^2}$, where $d_d^*$ is the d-component of the commanded voltage vector, $d_q^*$ is the q-component of the commanded voltage vector, $d_d$ is the d-component of the actual voltage vector, and $d_q$ is the q-component of the actual voltage vector.

14. The method of claim 13, wherein the generating of the indication of the fault is further based on a commanded modulation index equal to $\sqrt{d_d^{*2}+d_q^{*2}}$, an actual modulation index equal to $\sqrt{d_d^2+d_q^2}$, and an absolute value of a difference between the commanded modulation index and the actual modulation index.

15. The method of claim 14, wherein the generating of the indication of the fault further comprises determining if at least one of the commanded modulation index and the actual modulation is above a modulation index threshold.

16. An automotive electrical system comprising:
   an electric motor;

an inverter coupled to the electric motor, the inverter comprising at least one switch;

a Pulse Width Modulation (PWM) modulator coupled to the inverter; and a processing system in operable communication with the electric motor, the inverter, and the PWM modulator, the processing system being configured to:

receive first and second voltage commands corresponding to respective first and second components of a commanded voltage vector on a synchronous frame of reference coordinate system;

calculate a plurality of duty cycles for operating the at least one switch based on the first and second voltage commands;

calculate first and second actual voltages based on the plurality of duty cycles, the first and second actual voltages corresponding to respective first and second components of an actual voltage vector on the synchronous frame of reference coordinate system; and generate an indication of a fault based on the difference between the first component of the commanded voltage vector and the first component of the actual voltage vector and the difference between the second component of the commanded voltage vector and the second component of the actual voltage vector.

17. The system of claim 16, wherein the synchronous frame of reference coordinate system is a d-q coordinate system, the first components of the commanded voltage vector and the actual voltage vector are d-components, and the second components of the commanded voltage vector and the actual voltage vector are q-components.

18. The system of claim 17, wherein the generating of the indication of the fault is further based on a performance index equal to $\sqrt{(d_d^* - d_d)^2 + (d_q^* - d_q)^2}$, where $d_d^*$ is the d-component of the commanded voltage vector, $d_q^*$ is the q-component of the commanded voltage vector, $d_d$ is the d-component of the actual voltage vector, and $d_q$ is the q-component of the actual voltage vector.

19. The system of claim 18, wherein the generating of the indication of the fault is further based on a commanded modulation index equal to $\sqrt{d_d^{*2} + d_q^{*2}}$, an actual modulation index equal to $\sqrt{d_d^2 + d_q^2}$, and an absolute value of a difference between the commanded modulation index and the actual modulation index.

20. The system of claim 19, wherein the generating of an indication of the fault further comprises determining if at least one of the commanded modulation index and the actual modulation is above a modulation index threshold.

* * * * *